No. 711,371.
J. W. ALEXANDER.
CULTIVATOR.
(Application filed Dec. 31, 1901.)
Patented Oct. 14, 1902.
(No Model.)
2 Sheets—Sheet 1.
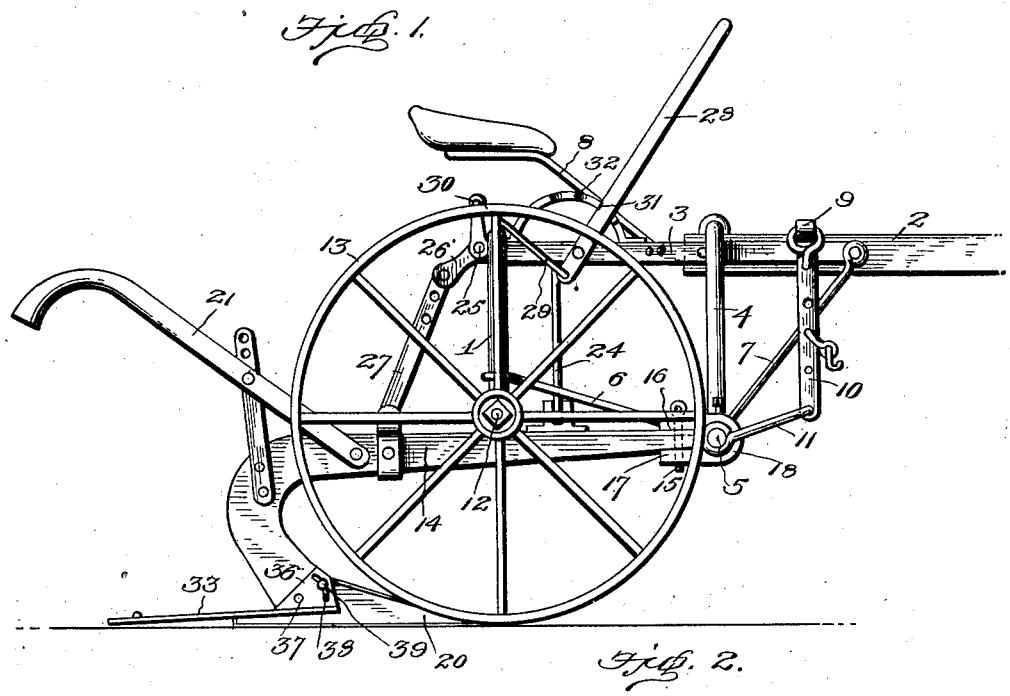
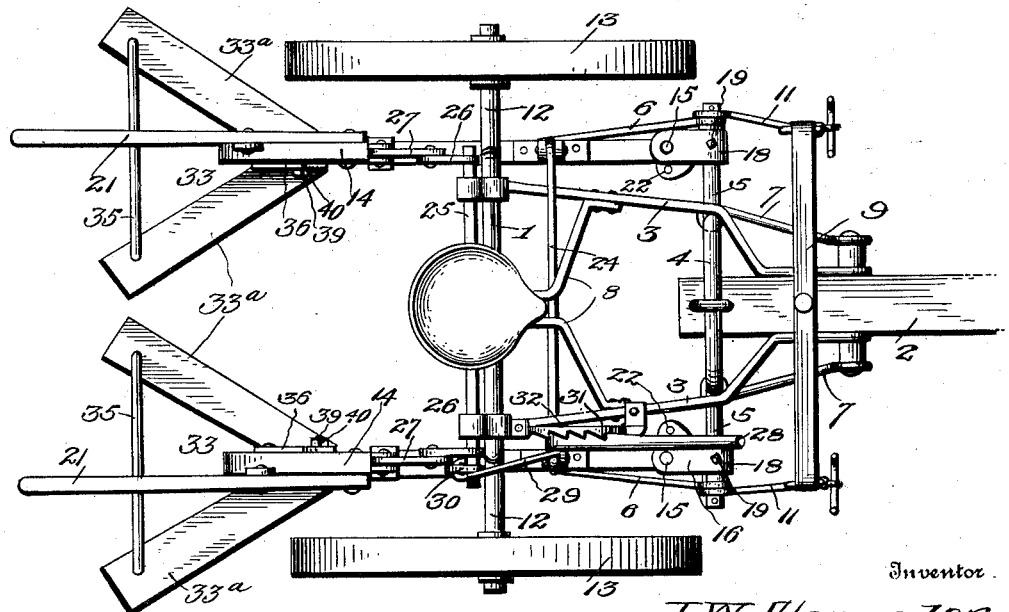
Witnesses
Inventor
J. W. Alexander
By Attorneys No. 711,371. Patented Oct. 14, 1902.
J. W. ALEXANDER.
CULTIVATOR.
(Application filed Dec. 31, 1901.)
(No Model.) 2 Sheets—Sheet 2.
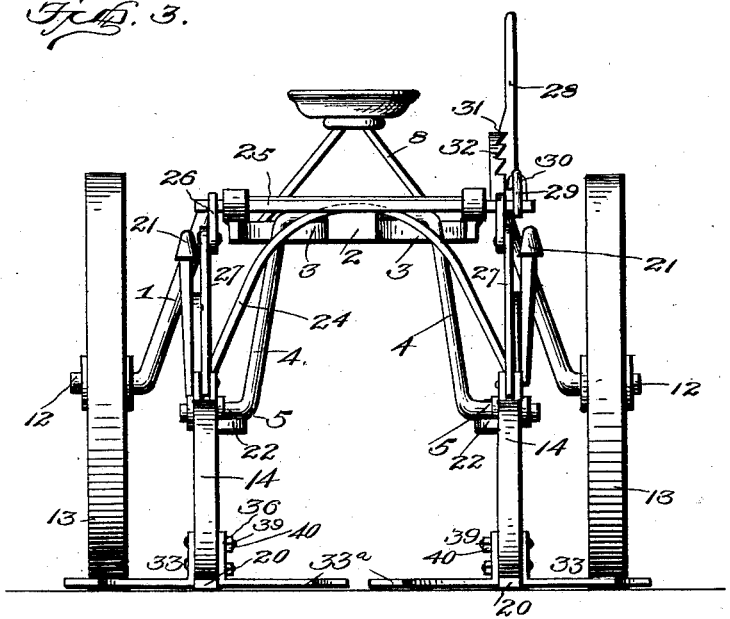
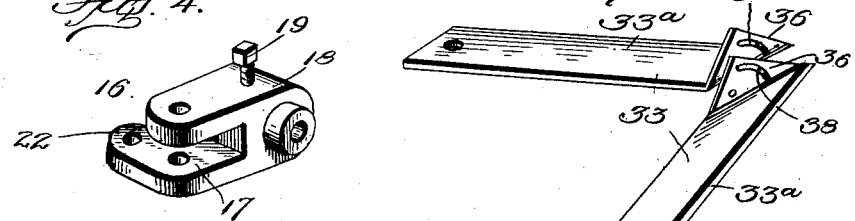
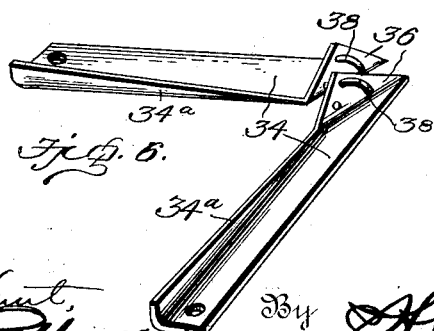

UNITED STATES PATENT OFFICE.

JOHN W. ALEXANDER, OF WHITEWOOD, SOUTH DAKOTA.

CULTIVATOR.

SPECIFICATION forming part of Letters Patent No. 711,371, dated October 14, 1902.

Application filed December 31, 1901. Serial No. 87,907. (No model.)

*To all whom it may concern:*

Be it known that I, JOHN W. ALEXANDER, a citizen of the United States, residing at Whitewood, in the county of Lawrence and State of South Dakota, have invented certain new and useful Improvements in Cultivators; and I do declare the following to be a full, clear, and exact description of the invention, such as will enable others skilled in the art to which it appertains to make and use the same.

This invention relates to improvements in cultivators, and is adaptable to wheeled cultivators of both the riding and the walking type.

The object of the invention is to provide a cultivator with improved means for throwing the plows into and out of operation, to provide for the attachment of a central or intermediate plow or shovel whenever desired between the two plows or shovels commonly used, to provide simple and effective cutting and covering blades interchangeable for attachment to the plows, and to generally simplify and improve the construction and increase the practical efficiency of agricultural implements of this class.

With these and other objects in view, which will readily appear as the nature of the invention is better understood, the same consists in certain novel features of construction and combination and arrangement of parts, which will be hereinafter fully described, defined in the appended claims, and illustrated in the accompanying drawings, in which—

Figure 1 is a view in side elevation of a cultivator embodying my invention. Fig. 2 is a top plan view thereof. Fig. 3 is a rear end elevation. Fig. 4 is a detail view of one of the bearing blocks or brackets. Fig. 5 is a detail view of a set of weed-cutting blades. Fig. 6 is a similar view of a set of covering-blades.

Referring now more particularly to the drawings, the numeral 1 represents the main transverse arch-shaped frame-beam of the cultivator; 2, the tongue or pole; 3, braces connecting the tongue to said beam; 4, a supporting-yoke provided with lateral arms 5 and supported by said tongue and braces; 6 and 7, braces respectively connecting said arms to the frame-beam and to the tongue; 8, the seat-supporting frame mounted upon said braces 3; 9, the doubletree or draft attachment; 10 and 11, sets of links connecting the doubletree to the arms 5; 12, stub shafts or axles projecting from the frame-beam 1, and 13 the carrying-wheels mounted on said shafts or axles. These parts may be of the ordinary or any approved construction.

The plow-beams 14 are pivotally connected at their forward ends to bolts 15, passed through spaced horizontal ears 16 and 17 on bearing brackets or blocks 18, pivoted or journaled upon the arms 5 of the yoke 4, which brackets are provided with set-screws 19 to engage said arms and hold the brackets fixed against movement, if desired. The beams 14 are thus pivoted to the brackets to swing laterally of the frame and to the arms 5 by means of said brackets to swing in a vertical plane.

The plows or shovels 20 may be of any approved type and applied to the beams in any desired manner. If the cultivator be of the walking type or a combined walking and riding cultivator, the beams will have handles 21 to enable them to be readily controlled. The lower ears 17 of the brackets 18 are formed with lateral extensions 22, apertured for the reception of pivot-bolts, whereby a third plow-beam (not shown) with an attached plow or shovel may be applied intermediate the two beams 14 to adapt the device for cultivating small grain and plants set out in close rows. The two beams 14 are connected so as to move in unison by an arched yoke 24.

A rock-shaft 25 is journaled in bearings on the beam 1 and is provided with crank-arms 26, which are connected to the beams 14 by links 27. This shaft is rocked or oscillated in one direction by a lever 28, connected by a link or jointed rod 29 to a third crank-arm 30 on said shaft. When the lever is swung forwardly, the crank-arms 26 will move upwardly, thereby drawing on the links 27 to regulate the depth of penetration of the soil by the plows or shovels or to raise said plows or shovels above the ground-surface. When the lever is swung rearwardly, the plows will descend by gravity in an obvious manner. A pawl-surface 31 on the lever is provided to engage a rack 32 on a fixed part of the frame, whereby the lever is locked in adjusted position. By the construction described it will be seen that the plows may be readily controlled by the operator walking behind or occupying the driver's seat.

The plows or shovels are adapted to have applied thereto rearwardly-extending diverging blades 33 or 34, the former having side cutting edges $33^a$ and the latter upturned deflectors $34^a$. These blades are used, as shown, in pairs and are connected together at or near their rear ends by a rod or bar 35, which serves as a spreader to level off the soil. The ends of this rod are detachably fitted in perforations in the blade. The blades 33 are used for cutting and turning down weeds or bushes, while the blades 34 are employed as coverers for throwing the loosened soil toward the plants. In each case the blades are formed with right-angularly-bent forward ends 36 to lie against the opposite sides of the plow-standard and to be secured thereto in any desired manner. In the present instance I have shown the blades 33 pivoted by bolts 37 to the standard and having arc slots 38 to receive threaded bolt ends 39, engaged by nuts 40, whereby the blades may be set at any desired angle and secured. The blades 34, which are interchangeable with the blades 33, are secured to the standards in the same manner.

From the foregoing description, taken in connection with the accompanying drawings, it is thought that the construction, mode of operation, and advantages of my invention will be readily apparent without requiring an extended explanation.

Various changes in the form, proportion, and the minor details of construction may be resorted to without departing from the principle or sacrificing any of the advantages of this invention.

Having thus described the invention, what is claimed, and desired to be secured by Letters Patent, is—

1. In a cultivator, the combination with a wheeled frame; of a supporting-arch connected to the frame and having lateral arms, brackets pivoted to said arms, each bracket having spaced horizontal ears, the lower ears being formed with extensions, bolts passed through the ears, plow-beams mounted to swing laterally on said bolts, and means for adjusting said beams in a vertical plane, substantially as specified.

2. In a cultivator, a plow or shovel, rearwardly-extending diverging blades attached thereto, and a leveling bar or rod uniting said blades near their rear ends, substantially in the manner set forth.

3. In a cultivator, a plow or shovel, rearwardly-extending diverging blades, a leveling bar or rod uniting said blades near their rear ends, and means for adjustably attaching said blades to the plow or shovel, substantially as and for the purpose described.

4. In a cultivator, a plow or shovel, rearwardly-extending diverging blades, a leveling bar or rod uniting said blades near their rear ends, covering-deflectors upon the blades, and means for adjustably attaching said blades to the plow or shovel, substantially as set forth.

In testimony whereof I have hereunto set my hand in presence of two subscribing witnesses.

JOHN W. ALEXANDER.

Witnesses:
WM. H. HIGHLEY,
J. W. ADDIE.